March 29, 1966 R. S. DE GRANDE ETAL 3,242,737
ENCODING SYSTEM FOR A NAVIGATIONAL APPARATUS
Filed Jan. 7, 1964 3 Sheets-Sheet 1

INVENTORS
ROBERT S. DeGRANDE
LEONARD BARON
BY
OSTROLENK, FABER, GERB & SOFFEN
ATTORNEYS

March 29, 1966  R. S. DE GRANDE ETAL  3,242,737
ENCODING SYSTEM FOR A NAVIGATIONAL APPARATUS
Filed Jan. 7, 1964  3 Sheets-Sheet 3

INVENTORS
ROBERT S. DeGRANDE
LEONARD BARON
BY
OSTROLENK, FABER, GERB & SOFFEN
ATTORNEYS

United States Patent Office 3,242,737
Patented Mar. 29, 1966

3,242,737
ENCODING SYSTEM FOR A NAVIGATIONAL
APPARATUS
Robert S. De Grande, Brooklyn, and Leonard Baron,
Syosset, N.Y., assignors to Kollsman Instrument Corp.,
Elmhurst, N.Y., a corporation of New York
Filed Jan. 7, 1964, Ser. No. 336,265
18 Claims. (Cl. 73—387)

This invention relates to a navigational apparatus, and more particularly to such an apparatus which is designed to provide automatically encoded information of in-flight navigational data with a high degree of accuracy, and having maximum compatibility with existing navigational equipment.

It is known in the aircraft instrumentation art to measure various navigational parameters by providing a device automatically responsive to variations in the parameter being measured. For example, to measure altitude, an aneroid cell may be provided, which when subjected to atmospheric change will expand or contract an amount proportional to the attendant pressure change. The movement of the aneroid cell is then mechanically interconnected to a pointer, to thereby provide the pilot with a visual display.

While such mechanically actuated aircraft instruments have been refined to provide very accurate indications, they cannot as a practical matter inherently include compensation for all possible factors. Hence, demands placed upon the aircraft instrumentation industry by the needs of high performance aircraft, such as commercial jets, have necessitated providing various correction or compensating factors to the mechanically derived navigational parameter variation. As, for example, U.S. Patent No. 3,009,358, entitled "Aircraft Instrument-Remote Control-Fail Safe" issued November 21, 1961 in the name of James W. Angus and assigned to the assignee of the instant invention, shows such a high performance altimeter arrangement. wherein the correction factor is obtained by an electrical system including, where desired, computing devices as well as information gathering and transmitting devices which may integrate information. The dual coupling of the mechanically derived altitude signal as well as the electrically computed correction factors may, for example, be accomplished by supporting the mechanical actuating system within a rotatable frame for operating a pointer with respect to a stationary indicating dial. The electrical system correction signal effects rotation of the frame and all internal elements, including the pointer, with respect to the indicating dial. Hence, the position of the pointer is combinedly determined by the mechanically actuated rotation of the pointer with respect to its supporting frame, in conjunction with the electrically actuated rotation of the supporting frame in accordance with the error correction signal.

In such altimeters it is also desirable that an initial barometric adjustment be made with respect to the barometric conditions of the area in which the instrument is located or will be located upon landing of its associated aircraft. This adjustment is typically made by a manually controlled knob which protrudes from the instrument in the pilot's control panel. When the instrument is constructed so as to have the mechanical reading modified by an electrically computed value as discussed above, the barometric adjustment may be typically made by connecting its output through a differential which includes the electrical connecting means for adjusting the pointer reading by rotating the frame. Hence, the barometric adjustment and electrical modification of the pointer position may be made independently of one another as transmitted via the mechanical differential.

In addition to providing the pilot with such in-flight information, the need also exists to relay such information to ground station air traffic controllers. Previously, such information had oftentimes been relayed by a direct voice communication link between the aircraft personnel and the ground station air traffic controller. However, increasing demands resulting from the variety and number of aircraft presently being flown as well as the need to avoid the human error factor in reading and translating the instrument indication have necessitated the promulgation of specific regulations for automatically encoding and transmitting such in-flight data.

To automatically provide such data transmission, various encoder arrangements of converting the navigational information to digital form have been previously proposed. However, the systems heretofore devised have been quite complex and intricate and have failed to provide significant compatibility with presently existing apparatus. Accordingly, my invention provides automatic encoding of such navigation information in an extremely simplified manner, advantageously permitting retrofit installation into existing flight instrument systems with a minimum of effort and cost, thereby achieving substantial simplicity of operation, increased reliability and cost reduction over the prior systems.

Basically, my invention provides for the accurate positioning of a digital encoder, responsive to the pointer position of a conventional type of error correctible navigational apparatus; as for example of the type shown in aforementioned U.S. Patent No. 3,009,358. It is to be understood, however, that the basic teachings of my invention may likewise be practiced in conjunction with numerous other navigational instruments to provide an accurate encoded read-out thereof. The pointer position is presently fed to the electrical portion of the error correcting computer by a Synchrotel. The Synchrotel position is servoed to the air data computer, which may for example supply a correction factor for scale error and static error, as determined by the pointer position. This correction factor signal is in turn fed to a correction servo, which supplies an input to the mechanical differential for rotating the frame, thereby correcting the pointer position in accordance with the computed error factor.

In accordance with my invention, the drive signal for rotating the encoder system is likewise obtained from the Synchrotel unit, which senses the pointer position. However, it should be noted that inasmuch as the pointer position is also adjusted for barometric variation, as manually inserted by the pilot, a substantial probability of error exists with respect to the magnitude of that adjustment factor. Hence, in accordance with my invention, the Synchrotel output is compensated for the barometric adjustment, thereby providing a pointer position signal referenced to the predetermined value of the aneroid cell calibration (e.g., namely 29.92" of mercury). This is advantageously achieved by driving the rotor of the Synchrotel responsive to the actual pointer position, while the stator or housing of the Synchrotel is driven by the barometric adjustment input. Hence, by differentially driving the Synchrotel such that its rotor-to-stator position remains unchanged responsive to a barometric adjustment input, the output thereof will be independent of the magnitude of such adjustment.

To further insure a high degree of accuracy in the encoder output, the Synchrotel output signal is corrected for inherent repeatable system errors such as those arising in the Synchrotel, encoder, gearing members and mechanical differential. I provide this by combinedly driving a differential and error correction cam responsive to the Synchrotel output signal. The correction signal provided by the cam follower is in turn presented to an additional input of the differential, such that the output thereof is corrected in accordance with the cam surface. The differential output, in turn, drives the encoder. The provision of the correction cam intermediate the Synchrotel drive signal (responsive to the pointer position) and the encoder output advantageously permits an adjustment for differing scale rates between the altimeter display and the encoder discs. This may for example, be provided by forming the cam surface correction signal in the form of an Archimedes' spiral to provide a "loss motion" connection over various portions of the altitude response.

It is therefore seen that the basic concept of my invention resides in providing extremely accurate encoded inflight data in a simplified and reliable manner, and offering maximum compatibility with respect to existing aircraft instrumentation. More particularly, my invention advantageously fulfills the altitude reporting requirements which have been promulgated for high performance aircraft.

It is accordingly a primary object of my invention to provide encoded navigational data in an accurate and efficient manner.

A further object of my invention is to provide an encoder arrangement, designed to effect maximum compatibility with existing navigational apparatus.

An additional object of my invention is to provide for accurate positioning of an encoder means responsive to an altimeter pointer indication, as electrically corrected for scale and/or static error, but referenced to a predetermined barometric condition, regardless of the instrument barometric setting.

Still another object of my invention is to provide such an encoder arrangement, wherein the encoder positioning means is further compensated for repeatable system errors to insure increased accuracy in the positioning thereof.

Still a further object of my invention is to provide an encoder drive signal responsive to altimeter pointer position, wherein the means for sensing the altimeter pointer position is differentially driven responsive to the actual pointer position and the manual barometric adjustment of the instrument, in a manner such that the output signal presented to the encoder drive apparatus will be referenced to a predetermined value, regardless of the setting of the barometric value on the altimeter.

These as well as other objects of my invention will readily become apparent upon a consideration of the following description and accompanying drawings in which.

Figure 1:
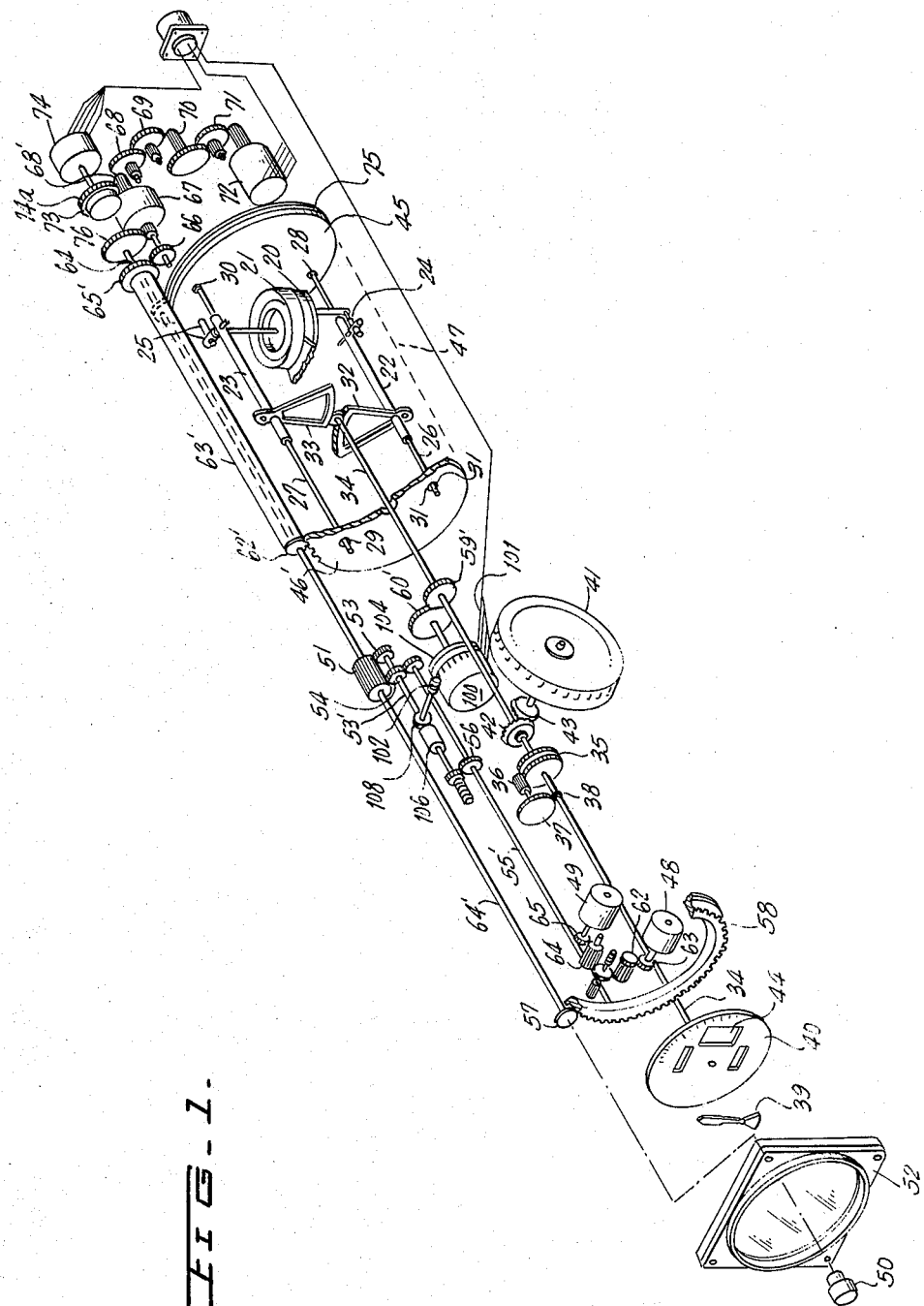
FIGURE 1 is an exploded view of an indicating device constructed basically in accordance with aforementioned U.S. Patent No. 3,009,358, but modified to accurately provide information compatible with the encoder apparatus of my invention.

Referring first to FIGURE 1, it is seen that the mechanical portion of my novel system is comprised of two aneroid elements 20 and 21, which expand and contract in accordance with variations in atmospheric pressure, in the well known manner. The provision of a plurality of such individual cells is preferably provided for increased sensitivity of operation. The aneroid elements 20, 21 are connected in parallel to the rocking shafts 22 and 23 respectively through arms which engage the bimetal temperature compensators 24 and 25. These bimetal compensators appropriately correct the mechanism for ambient temperature variations, so as to provide full altitude range compensation over a wide range of temperature; with the aneroid elements 20, 21 being typically referenced to 29.92" of mercury.

The rocking shafts 22 and 23 are supported on members 26 and 27 respectively, which are in turn connected to the ends of the mechanism frame 47, indicated generally by the dotted lines. Member 26 is connected to the mechanism frame 47 at points 28 and 29, while member 27 is connected to the mechanism frame at the points 30 and 31. The rocking shafts 22 and 23 are further connected to gear sections 32 and 33 respectively, which operate on a gear associated with the shaft 34. Shaft 34 is then connected through the gear transmission arrangement 35, 36, 37, 38 to the instrument pointer 39, which rotates with respect to the indicating dial 40.

The shaft 34 is also connected to a drum 41 by means of the gears 42 and 43, the drum 41 serving as a coarse indicator of altitude, while the rotation of pointer 49 indicates for example a 70,000 foot change in altitude per 360° rotation. In the assembled instrument the drum 41 will be observable through aperture 44 in the indicating dial 40.

It is to be noted that the mechanism body or frame 47, which has the ends comprising the plates 45 and gear 46, is rotatable with respect to the mechanism shown in FIGURE 1 as being in front of the gear 46. Hence, a rotation of the frame 47 will effect the rotation of the pointer 39, which is connected to frame 47 with respect to the indicating dial 40. That is to say, the pointer 39 which, of course, includes indicating drum 41 as an essential part thereof is rotatable with respect to the dial in two manners: the first would be a rotation due to rotation of shaft 34 because of expansion or contraction of aneroid elements 20 and 21, and the second by means of rotation of the complete frame assembly 47.

Two barometric counters 48 and 49 are also provided with drum 48 indicating inches of mercury, and drum 49 indicating millibars. Barometric counters 48 and 49 are adjustable by the manual adjustment knob 50 protruding from in front of housing flange 52. Adjustment knob 50 rotates a gear 51, which in turn rotates gears 53 and 54 secured to shaft 53', with gear 54 rotating gear 55 and shaft 55' thereof. The rotation of shaft 55' in turn rotates gear 57 at the forward end thereof, which in turn cooperates with the spiral gear 58. Spiral gear 58 then actuates the gear train including gears 59, 60, 61, 62, 63 and 65, with gear 63 actuating the barometric counter 48 and gear 65 actuating the barometric counter 49.

The rotation of shaft 64 by the adjustment of barometric setting knob 50 also serves to rotate frame 47 through gear 76, differential 67, output gears 66 thereof, and finally gears 65', 62' and 46.

So as to allow electrical correction of the mechanical reading of the instrument described above, the shaft 34 is provided with a gear 59', which cooperates with a gear 60' to position the rotor input of Synchrotel 100. The output of Synchrotel 100, representative of pointer 39 position, is transmitted via wires 101 to the electrical correction computer shown in FIGURE 3. In the manner to be subsequently discussed in detail in conjunction with schematic FIGURE 2, the electrical correction signal in turn drives servo motor 72 to position Synchrotel 74 for applying the computed correction signal to the altimeter reading. More specifically, the electrical correction factor is applied to the instrument of FIGURE 1 through the gear 46' by means of a cooperating gear 62', which is attached to a sleeve 63' connected to a gear 65'. The gear 65' is in turn connected to an output gear 66 of a mechanical differential 67. Input 68' of mechanical differential 67 is driven by servo motor 72 (in accordance with the computed correction signal) via gears 68, 69, 70 and 71. The mechanical differential is also connected to a means 73 for automatic return of frame 47 to a non-compensated position responsive to electrical failure, as is fully set forth in above-mentioned U.S. Patent No. 3,009,358, with reference being made thereto for a detailed description of its operation.

During normal operation the electrical correction signal computed to modify the pointer position in accordance with predetermined scale and/or static error, rotates frame 47 through gear 62' in accordance with an input to differential 67 from servo 72. As previously noted, a rotation of barometric setting knob 50 also provides an input to differential 67 via gear 76. Hence, the output of differential 67 for rotating frame 47 is combinedly determined by the electrical error correction signal and barometric adjustment presented to mechanical differential 67.

The above described operation of the altimeter mechanism corresponds essentially to that shown in previously mentioned U.S. Patent No. 3,009,358. My invention departs therefrom, however, in providing a second input to Synchrotel 100 responsive to the barometric setting adjustment of knob 50. That is, the rotation of shaft 53' rotates worm gear 102, peripherally engaging the external geared surface 104 of the Synchrotel 100 housing, with such rotation being effected via engaged gears 106, 108. As will be more fully discussed below, the provision of two inputs to Synchrotel 100, a first via gear 60' responsive to the actual rotation of pointer shaft 34, and a second via worm gear 102 responsive to the manually set barometric adjustment of knob 50, will differentially drive Synchrotel 100 so as to cancel out the barometric adjustment movement of pointer 39, and thereby provide an output signal continually referenced to the calibration of aneroid cells 20, 21 (e.g. 29.92″ of mercury).

It is important to note that inasmuch as the barometric adjustment is manually inserted in accordance with the barometric condition of the area in which the aircraft is located or will be located upon landing, this input can provide a significant error in the encoded signal transmitted to the ground station air traffic controller. Hence, in accordance with my invention, the differential driving of Synchrotel 100 will compensate out for the barometric adjustment rotation of frame 47, thereby providing an encoded output referenced to the predetermined calibration of the aneroid cells 20, 21.

Figure 2:
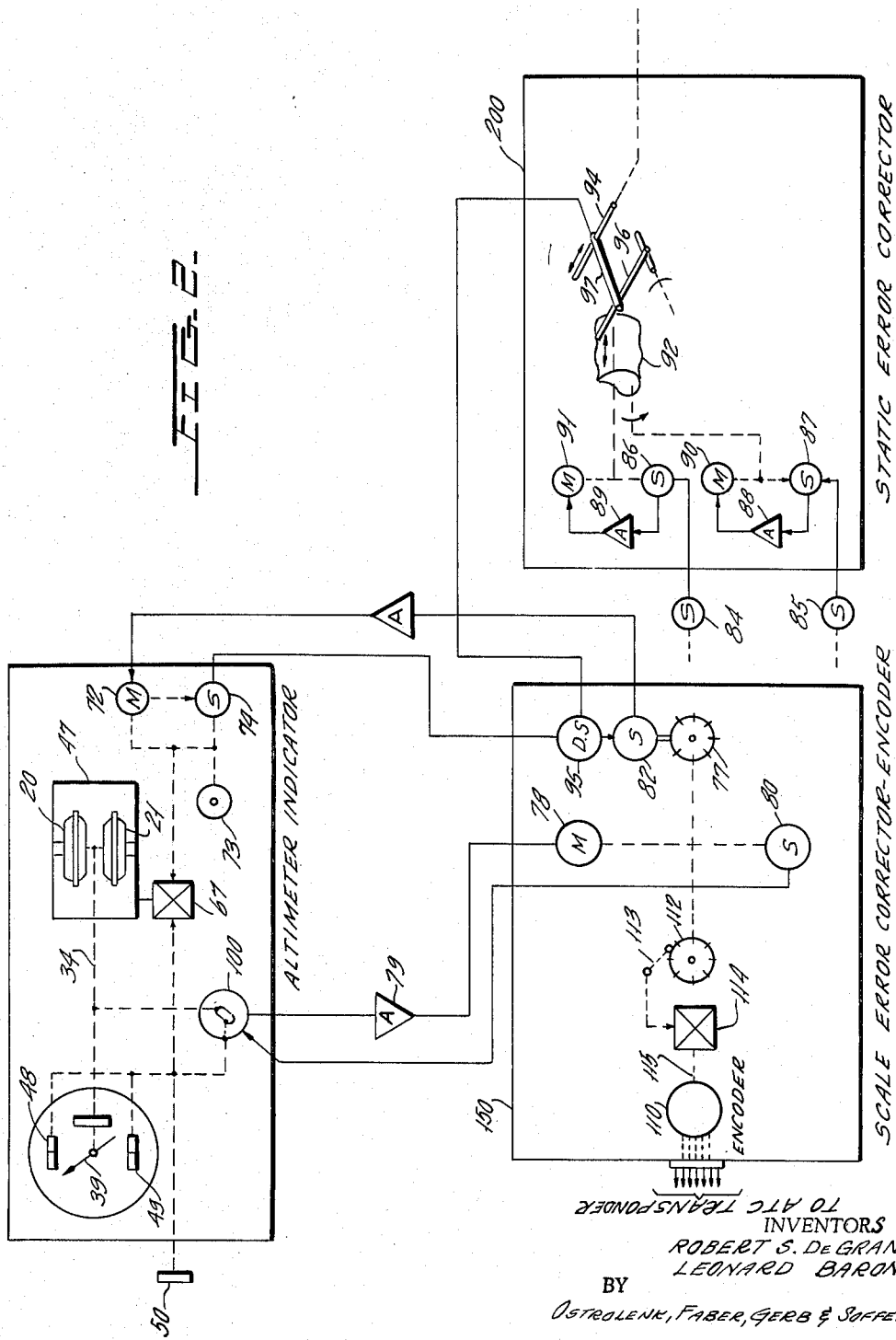
FIGURE 2 is a schematic diagram illustrating the operation of my novel system.

The operation of my invention may now be seen in conjunction with FIGURE 2, which schematically shows the electrical correcting system as being comprised of two independent components, the first of which 150 is a scale error corrector and the second 200 a static error corrector, with the scale error corrector unit including the encode apparatus of my invention. It is to be understood that either of the scale or static error correction systems may be used individually or if desired may be used together as is shown in that figure. Further, the system shown in FIGURE 2 may be provided for the pilot, with there being a corresponding co-pilot's unit to permit automatic comparison therebetween for increased reliability, in the manner generally shown in copending U.S. patent application (K–95) Serial No. 811,-508 filed May 6, 1959 in the name of Everett H. Schroeder entitled "Integrated Flight Instrument System," now Patent Number 3,112,644, and assigned to the assignee of the instant invention.

The block labelled indicator is a schematic representation of the indicating device in FIGURE 1, wherein similar components have been given similar designations. Thus, in FIGURE 2 the frame 47 has a pointer 39 and Synchrotel 100 mounted thereon. The mechanical differential which effects rotation of the frame 47 is shown as being operable through the adjustment knob 50, which is also connected to barometric counters 48, 49, Synchrotel 100 and through the spring return mechanism 73 which is connected to the motor 72 and the synchro 74.

Figure 3:
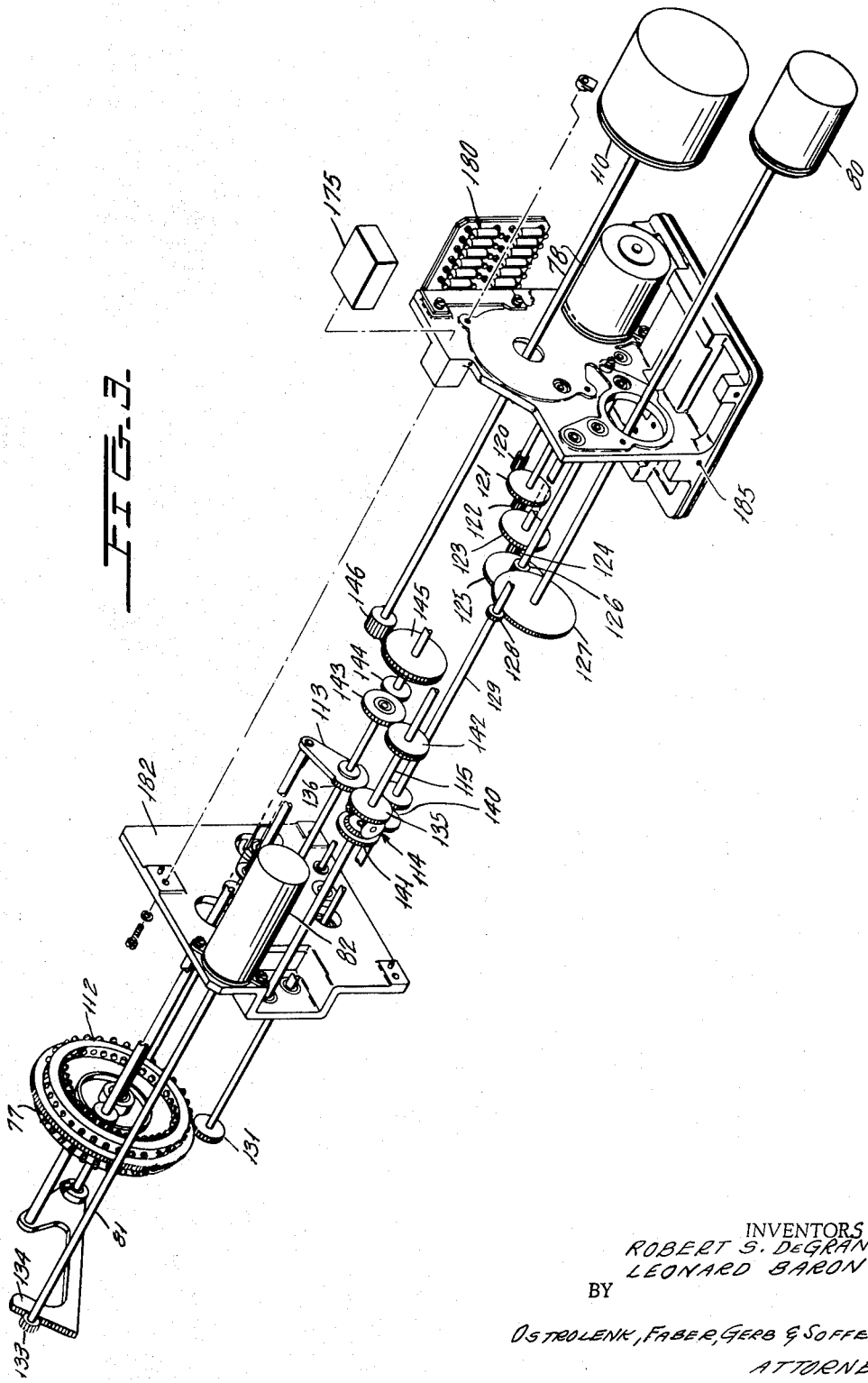
FIGURE 3 is an exploded perspective view of a combined scale error corrector and encoder mechanism constructed in accordance with the novel teachings of my invention.

Since the indicating instrument has certain inherent errors in view of its mechanical structure, an instrument error corrector may be remotely positioned and is provided with a correcting cam 77, which could have a continuous cam surface, or if desired can be provided with a plurality of adjustable cam points as is seen in FIGURE 3. The correcting cam 77 is rotatively positioned responsive to shaft 34, rotation by the synchro type servo mechanism including motor 78, Synchrotel 100, amplifying device 79 and synchro 80. This, in turn, positions the cam roller 81, which varies the position of the stator of the instrument error synchro 82.

In the event that the scale error corrector 150 is being used alone, then the instrument error synchro 82 would be connected to the correction synchro 74 of the indicator and motor 72 would be energized through an amplifier to rotate the frame 47 of the indicating instrument mechanism until correction synchro 74 is rotated to a position given by the instrument error synchro 82.

If it is also preferable to compensate the indicator for static error correction inasmuch as the device is exposed only to static pressure, static error corrector 200 will correct for Mach number and for local angle of attack. The static error correcting system may be remotely connected at any convenient point of the aircraft, and is comprised of an angle of attack synchro 84, which is connected to a sensor of angle of attack and a Mach synchro 85 which is connected to a sensor of Mach number of the aircraft, as is more fully set forth in above-mentioned U.S. patent application Serial No. 811,508. Each synchro 84 and 85 operates a system including synchros 86 and 87 respectively, amplifiers 88 and 89 respectively and motors 90 and 91 respectively for controlling the position of a three dimensional cam surface 92. More specifically, the motor 91 controls the longitudinal position of three dimensional cam surface 92, while motor 90 controls the angular position of cam surface 92. Hence, the coordinated positioning of cam surface 92 by motors 90 and 91 will be imparted to the cam follower 93 to position the shaft 94 of a differential synchro 95 through the multiplying lever mechanism, including levers 96 and 97.

Thus, it is seen that motor 72 will be energized until the positions of synchro 74, 82 and 95 satisfy one another so as to position frame 47 in accordance with the requirements of the scale error corrector 150 and the static error corrector 200.

In accordance with my invention, the output of differentially driven Synchrotel 100 is likewise used to position encoder 110, such that the positioning of encoder 110 will correspond to the mechanically actuated movement of pointer 39, as electrically corrected for scale error and static error, but compensated for the manual barometric adjustment inserted via knob 50. Rather than having motor 78 driving encoder 110 directly, an additional error correction cam 112 and differential 114 is inserted therebetween to correct for repeatable system errors such as are present in synchro 100, encoder 110, mechanical differential 67 and their associated gearing. Further, the cam surface of corrector cam 112 may likewise provide a correction for varying scale rates of the altimeter pointer 39 and encoder 110. As for example, the indicating instrument may have a scale rate of 70,000' per 360° of rotation, whereas the ARINC code rate is 72,000' per 360° of rotation. Because of the difference of scale rates, a loss motion arrangement is provided to slow down the rotation of the altitude encoder shafts to that of the altimeter for the altitude range of −1,000' to +60,000'. The motion of the encoder shaft must then rotate at a faster rate than the altimeter from 60,000' to −1,000' so that the encoder shaft position returns to its −1,000' position when the shaft has rotated through a complete revolution. That is, synchronization between the altimeter and the encoder must be maintained regardless of the direction of rotation of the encoder or the number of turns of the encoder shaft. This loss motion feature may be achieved by forming the cam surface of encoder correction cam 112 in the form of an Archimedes' spiral.

The servoed shaft position of motor 78 provides the rotational input to correction cam 112 as well as one input to mechanical differential 114. Cam follower arm 113 provides a second input to mechanical differential 114, such that the output 115 thereof corresponds to the servoed output of motor 78 as corrected in accordance with the configuration of adjustable correcting cam 112.

Reference is now made to FIGURE 3, which is an exploded perspective view of the scale error corrector encoder system 150 electrically shown in FIGURE 2. Motor 78 drives synchro 80 (responsive to the electrical input signal from Synchrotel 100 of the indicator portion) via gear train members 120, 121, 122, 123, 124, 125, 126 and 127. Gear 127 also drives shaft 129 via gear 128, which in turn drives common adjustable cam members 77, 112, via gear 131. Static error correction cam 77 and encoder correction cam 112 are preferably formed of a single unit construction as shown, so as to effect a substantial reduction in assembly and tracking errors.

Cam follower 81 of scale error cam 77 provides an input to synchro 82 via the engagement of gears 133, 134 respectively. Cam 112 similarly provides a first input to encoder differential 114 determined by the position of cam follower arm 113 by virtue of the engagement of gear members 135, 136 respectively; the other input to differential 114, responsive to the servoed rotation of shaft 129 being provided by the engagement of gears 140, 141 respectively. The output of differential 114 appearing at shaft 115 is in turn transmitted to digital encoder 110 via the gear train including gear members 142, 143, 144, 145, and 146. Digital encoder 110 may, for example, be calibrated in accordance with the ARINC-specified MOA-Gillham code, to provide 100′ increments. The overall range of encoded output may be between −1,000′ to +50,000′. Error correction cam 112 may be in the form of an Archimedes' spiral through an altitude range of −1,000′ to +60,000′, such that one revolution thereof is equivalent to 70,000 feet to apply the appropriate for varying scale rates.

Encoder 110 may be of the double disc brush-type variety having a twelve track digitizer with a bit transition accuracy of plus or minus 15′. A logic circuit 175 and encoder diode arrangement 180 may be provided to obtain the necessary correlation between discs. Digital encoder unit 110 may have an overall diameter of 1½″, thereby providing extreme compactness and ease of retrofit compatibility with existing navigational instrument systems. With the exception of synchro 82, all the electromechanical rotating components are preferably mounted on a single casting 185, which serves as both a base plate and component mounting plate. The electrical mechanical components, the logic network subassembly 175 and the isolation diode assembly 180 are all mounted on casting 175 and preferably wired before the unit's gear train is assembled, to prevent contamination of the gear train by foreign matter during the electrical component wiring. It will be noted that all electrical components are accessible at one side of the assembly to facilitate adjustment, replacement and calibration. The gear train members are mounted between base plate casting 175 and a bearing plate 182, with the adjustable cam members 77, 112 being mounted on the exterior of bearing plate 182 to provide increased accessibility for calibration adjustment.

Although in the foregoing specification, the instant invention has been described in conjunction with preferred embodiments, many variations and modifications will now become apparent to those skilled in the art, and it is preferred, therefore, that the instant invention be limited not by the specific disclosure contained herein but only by the appended claims.

The embodiments of the invention in which an exclusive privilege or property is claimed are defined as follows.

1. In an encoder arrangement for a navigational apparatus having a visual display means: first operating means for providing an output indication at said visual display means responsive to variations from a predetermined reference value of the navigational parameter being sensed; adjustment means for correcting said output indication, as determined by a variation of the reference from said predetermined value; second operating means to correct said output indication, as determined by said first operating means, in accordance with the known error of said apparatus when driven by said first operating means; first means for combinedly driving said visual display means responsive to said first operating means, second operating means and adjustment means; sensing means for generating a drive signal responsive to said output indication; second means for presenting a compensating signal to said sensing means responsive to said adjustment means signal, whereby said drive signal is referenced to said predetermined reference value; third means for positioning an encoder means responsive to said drive signal.

2. In an encoder arrangement for a navigational apparatus having a visual display means: first operating means for providing an output indication at said visual display means responsive to variations from a predetermined reference value of the navigational parameter being sensed; adjustment means for correcting said output indication, as determined by a variation of the reference from said predetermined value; second operating means to correct said output indication, as determined by said first operating means, in accordance with the known error of said apparatus when driven by said first operating means; first means for combinedly driving said visual display means responsive to said first operating means, second operating means and adjustment means; sensing means for generating a drive signal responsive to said output indication; second means for presenting a compensating signal to said sensing means responsive to said adjustment means signal, whereby said drive signal is referenced to said predetermined reference value; third means for positioning an encoder means responsive to said drive signal; said third means including a first error correction means, predeterminedly adjusted for repeatable system errors and differential means; said drive signal driving said first error correction means and a first input of said differential means; the driven position of said first error correction means presenting a second input signal to said differential; the output of said differential means positioning said encoder means, whereby said encoder means is driven by said drive signal, as referenced to said predetermined reference value and corrected for repeatable system errors.

3. In an encoder arrangement for a navigational apparatus having a visual display means: first operating means for providing an output indication at said visual display means responsive to variations from a predetermined reference value of the navigational parameter being sensed; adjustment means for correcting said output indication, as determined by a variation of the reference from said predetermined value; second operating means to correct said output indication, as determined by said first operating means, in accordance with the known error of said apparatus when driven by said first operating means; first means for combinedly driving said visual display means responsive to said first operating means, second operating means and adjustment means; sensing means for generating a drive signal responsive to said output indication; second means for presenting a compensating signal to said sensing means responsive to said adjustment means signal, whereby said drive signal is referenced to said predetermined reference value; third means for positioning an encoder means responsive to said drive signal; said sensing means comprising a differentially driven Synchrotel; said output indication presenting a first input signal to said Synchrotel; said compensating signal presenting a second input signal to said Synchrotel; said first and second input signals combining in said Synchrotel to reference the drive signal output thereof to said predetermined reference value.

4. In an encoder arrangement as set forth in claim 3: one of said first or second Synchrotel input signals mechanically driving the Synchrotel rotor and the other of said first or second signals mechanically driving the Synchrotel stator, whereby the rotor-to-stator position of said Synchrotel remains unchanged responsive to an adjustment means correction of said output indication.

5. In an encoder arrangement for a navigational apparatus having a visual display means: first operating means for providing an output indication at said visual display means responsive to variations from a predetermined reference value of the navigational parameter being sensed; adjustment means for correcting said output indication, as determined by a variation of the reference from said predetermined value; second operating means to correct said output indication, as determined by said first operating means, in accordance with the known error of said apparatus when driven by said first operating means; first means for combinedly driving said visual display means responsive to said first operating means, second operating means and adjustment means; sensing means for generating a drive signal responsive to said output indication; second means for presenting a compensating signal to said sensing means responsive to said adjustment means signal, whereby said drive signal is referenced to said predetermined reference value; third means for positioning an encoder means responsive to said drive signal; said sensing means comprising a differentially driven Synchrotel; said output indication presenting a first input signal to said Synchrotel; said compensating signal presenting a second input signal to said Synchrotel; said first and second input signals combining in said Synchrotel to reference the drive signal output thereof to said predetermined reference value; said third means including a first error correction means, predeterminedly adjusted for repeatable system errors, and differential means; said drive signal driving said first error correction means and a first input of said differential means; the driven position of said first error correction means presenting a second input signal to said differential; the output of said differential means positioning said encoder means, whereby said encoder means is driven by said drive signal, as referenced to said predetermined reference value, and corrected for repeatable system errors.

6. In an encoder arrangement for a navigational apparatus having a visual display means: first operating means for providing an output indication at said visual display means responsive to variations from a predetermined reference value of the navigational parameter being sensed; adjustment means for correcting said output indication, as determined by a variation of the reference from said predetermined value; second operating means to correct said output indication, as determined by said first operating means, in accordance with the known error of said apparatus when driven by said first operating means; first means for combinedly driving said visual display means responsive to said first operating means, second operating means and adjustment means; sensing means for generating a drive signal responsive to said output indication; second means for presenting a compensating signal to said sensing means responsive to said adjustment means signal, whereby said drive signal is referenced to said predetermined reference value; third means for positioning an encoder means responsive to said drive signal; said third means including a first error correction means, predeterminedly adjusted for repeatable system errors, and differential means; said drive signal driving said first error correction means, and a first input of said differential means; the driven position of said first error correction means presenting a second input signal to said differential; the output of said differential means positioning said encoder means, whereby said encoder means is driven by said drive signal, as referenced to said predetermined reference value, and corrected for repeatable system errors; said second operating means including a second error correction means, predeterminedly adjusted for apparatus scale error; said second error correction means being driven responsive to said drive signal, whereby said first and second error correction means are driven in synchronism.

7. In an encoder arrangement as set forth in claim 6, wherein said first and second error correction means are surface adjustable cam members, rotated about a common shaft.

8. In an encoder arrangement for a navigational apparatus having a pointer mounted with respect to a housing, and an indicating dial; said pointer being rotatable with respect to said housing and said indicating dial; said housing being rotatably mounted with respect to said indicating dial; a first and second operating means; said first operating means being operatively connected to said pointer to rotate said pointer with respect to said housing, responsive to variation of a navigational parameter from a predetermined reference value; said second operating means being operatively connected to said housing and constructed to rotate said housing; said second operating means being constructed to continuously correct the positioning of said pointer by said first operating means in accordance with the known error of said apparatus when driven by said first operating means; an adjusting means to provide a variation of said reference from said predetermined value; said adjusting means being operatively connected to said housing and constructed to adjust the position of said pointer; first coupling means connecting said adjusting means and second operating means to said housing to position said housing, and thus said pointer, independently of one another; an encoder means to be positioned in accordance with said pointer position; sensing means for sensing said pointer position and generating a drive signal for presentment to said encoder means; said sensing means having a first input signal responsive to said pointer position, and a second input signal responsive to said adjusting means variation; said sensing means combining said first and second input signals in a manner obtaining said drive signal representative of said pointer position, as referenced to said predetermined value.

9. In an encoder arrangement for a navigational apparatus having a pointer mounted with respect to a housing, and an indicating dial; said pointer being rotatable with respect to said housing and said indicating dial; said housing being rotatably mounted with respect to said indicating dial; a first and second operating means; said first operating means being operatively connected to said pointer to rotate said pointer with respect to said housing, responsive to variation of a navigational parameter from a predetermined reference value; said second operating means being operatively connected to said housing and constructed to rotate said housing; said second operating means being constructed to continuously correct the positioning of said pointer by said first operating means in accordance with the known error of said apparatus when driven by said first operating means; an adjusting means to provide a variation of said reference from said predetermined value; said adjusting means being operatively connected to said housing and constructed to adjust the position of said pointer; first coupling means connecting said adjusting means and second operating means to said housing to position said housing, and thus said pointer, independently of one another; an encoder means to be positioned in accordance with said pointer position; sensing means for sensing said pointer position and generating a drive signal for presentment to said encoder means; said sensing means having a first input signal responsive to said pointer position, and a second input signal responsive to said adjusting means variation; said sensing means combining said first and second input signals in a manner obtaining said drive signal representative of said pointer position, as referenced to said predetermined value; said sensing means comprising a differentially drive Synchrotel; wherein one of said first or second Synchrotel input signals mechanically drives the Synchrotel rotor, and the other of said first or second signals mechanically drives the Synchrotel stator, whereby the rotor-to-stator position of said Synchrotel remains unchanged resepsonsive to an adjustment means correction of said pointer position.

10. In an encoder arrangement for a navigational apparatus having a pointer mounted with respect to a housing, and an indicating dial; said pointer being rotatable with respect to said housing and said indicating dial; said housing being rotatably mounted with respect to said indicating dial; a first and second operating means; said first operating means being operatively connected to said pointer to rotate said pointer with respect to said housing, responsive to variation of a navigational parameter from a predetermined reference value; said second operating means being operatively connected to said housing and constructed to rotate said housing; said second operating means being constructed to continuously correct the positioning of said pointer by said first operating means in accordance with the known error of said apparatus when driven by said first operating means; an adjusting means to provide a variation of said reference from said predetermined value; said adjusting means being operatively connected to said housing and constructed to adjust the position of said pointer; first coupling means connecting said adjusting means and second operating means to said housing to position said housing, and thus said pointer, independently of one another; an encoder means to be positioned in accordance with said pointer position; sensing means for sensing said pointer position and generating a drive signal for presentment to said encoder means; said sensing means having a first input signal responsive to said pointer position, and a second input signal responsive to said adjusting means variation; said sensing means combining said first and second input signals in a manner obtaining said drive signal representative of said pointer position, as referenced to said predetermined value; second coupling means for presenting said drive signal to said encoder means; said second coupling means including a first error correction means, predeterminedly adjusted for repeatable system errors and differential means; said drive signal driving said first error correction means, and a first input of said differential means; the driven position of said first error correction means presenting a second input signal to said differential; the output of said differential means positioning said encoder means, whereby said encoder means is driven by said drive signal, as referenced to said predetermined reference value, and corrected for repeatable system errors.

11. In an encoder arrangement for a navigational apparatus having a pointer mounted with respect to a housing, and an indicating dial; said pointer being rotatable with respect to said housing and said indicating dial; said housing being rotatably mounted with respect to said indicating dial; a first and second operating means; said first operating means being operatively connected to said pointer to rotate said pointer with respect to said housing, responsive to variation of a navigational parameter from a predetermined reference value; said second operating means being operatively connected to said housing and constructed to rotate said housing; said second operating means being constructed to continuously correct the positioning of said pointer by said first operating means in accordance with the known error of said apparatus when driven by said first operating means; an adjusting means to provide a variation of said reference from said predetermined value; said adjusting means being operatively connected to said housing and constructed to adjust the position of said pointer; first coupling means connecting said adjusting means and second operating means to said housing to position said housing, and thus said pointer, independently of one another; an encoder means to be positioned in accordance with said pointer position; sensing means for sensing said pointer position and generating a drive signal for presentment to said encoder means; said sensing means having a first input signal responsive to said pointer position, and a second input signal responsive to said adjusting means variation; said sensing means combining said first and second input signals in a manner obtaining said drive signal representative of said pointer position, as referenced to said predetermined value; said sensing means comprising a differentially driven Synchrotel; second coupling means for presenting said drive signal to said encoder means.

12. In an encoder arrangement for a navigational apparatus having a pointer mounted with respect to a housing, and an indicating dial; said pointer being rotatable with respect to said housing and said indicating dial; said housing being rotatably mounted with respect to said indicating dial; a first and second operating means; said first operating means being operatively connected to said pointer to rotate said pointer with respect to said housing, responsive to variation of a navigational parameter from a predetermined reference value; said second operating means being operatively connected to said housing and constructed to rotate said housing; said second operating means being constructed to continuously correct the positioning of said pointer by said first operating means in accordance with the known error of said apparatus when driven by said first operating means; an adjusting means to provide a variation of said reference from said predetermined value; said adjusting means being operatively connected to said housing and constructed to adjust the position of said pointer; first coupling means connecting said adjusting means and second operating means to said housing to position said housing, and thus said pointer, independently of one another; an encoder means to be positioned in accordance with said pointer position; sensing means for sensing said pointer position and generating a drive signal for presentment to said encoder means; said sensing means having a first input signal responsive to said pointer position, and a second input signal responsive to said adjusting means variation; said sensing means combining said first and second input signals in a manner obtaining said drive signal representative of said pointer position, as referenced to said predetermined value; second coupling means for presenting said drive signal to said encoder means; said second coupling means including a first error correction means, predeterminedly adjusted for repeatable system errors and differential means, and a first input of said differential means; the driven position of said first error correction means presenting a second input signal to said differential; the output of said differential means positioning said encoder means, whereby said encoder means is driven by said drive signal, as deferenced to said predetermined reference value, and corrected for repeatable system errors; said second operating means including a second error correction means, predeterminedly adjusted for apparatus scale error; said second error correction means being driven responsive to said drive signal, whereby said first and second error correction means are driven in synchronism.

13. In an encoder arrangement as set forth in claim 12, wherein said first and second error correction means are surface adjustable cam members, rotated about a common shaft.

14. In an encoder arrangement as set forth in claim 10, wherein: said indicator dial and encoder means have differing scale rates; said first error correction means is formed to continuously compensate for said differing scale rates.

15. In combination, an altitude sensing instrument and an encoder means therefor; first means for activating a first output of said altitude sensing instrument responsive to a measured variation of altitude; second means for correcting said first output in accordance with the known error of said altitude sensing instrument when actuated by said first means; third means for correcting said first output in accordance with known barometric variation from a predetermined reference value; sensing means for obtaining a second output of said altitude sensing instrument; said sensing means having a first input responsive to said first output, as combinedly determined by said first, second and third means; and a second input responsive to said third means; said sensing means combining said first and second inputs in a manner obtaining said second output, representative of said first output, as referenced to said predetermined value; coupling means for presenting said second output to said encoder means.

16. In combination, an altitude sensing instrument and an encoder means therefor; first means for activating a first output of said altitude sensing instrument responsive to a measured variation of altitude; second means for correcting said first output in accordance with the known error of said altitude sensing instrument when actuated by said first means; third means for correcting said first output in accordance with known barometric variation from a predetermined reference value; sensing means for obtaining a second output of said altitude sensing instrument; said sensing means having a first input responsive to said first output, as combinedly determined by said first, second and third means; and a second input responsive to said third means; said sensing means combining said first and second inputs in a manner obtaining said second output, representative of said first output, as referenced to said predetermined value; coupling means for presenting said second output to said encoder means; said coupling means including a first error correction means, predeterminedly adjusted for repeatable system errors, and differential means; said second output driving said first error correction means, and a first input of said differential means; the driven position of said first error correction means presenting a second input signal to said differential; the output of said differential means positioning said encoder means, whereby said encoder means is driven by said second output signal, as referenced to said predetermined reference value, and corrected for repeatable system errors.

17. In combination, an altitude sensing instrument and an encoder means therefor; first means for activating a first output of said altitude sensing instrument responsive to a measured variation of altitude; second means for correcting said first output in accordance with the known error of said altitude sensing instrument when actuated by said first means; third means for correcting said first output in accordance with known barometric variation from a predetermined reference value; sensing means for obtaining a second output of said altitude sensing instrument; said sensing means having a first input responsive to said first output, as combinedly determined by said first, second and third means; and a second input responsive to said third means; said sensing means combining said first and second inputs in a manner obtaining said second output, representative of said first output, as referenced to said predetermined value; coupling means for presenting said second output to said encoder means; said sensing means comprising a differentially driven Synchrotel; wherein one of said first or second Synchrotel input signals mechanically drives the Synchrotel rotor, and the other of said first or second signals mechanically drives the Synchrotel stator, whereby the rotor-to-stator position of said Synchrotel remains unchanged, responsive to a third means correction for barometric variation.

18. In combination, an altitude sensing instrument and an encoder means therefor; first means for activating a first output of said altitude sensing instrument responsive to a measured variation of altitude; second means for correcting said first output in accordance with the known error of said altitude sensing instrument when actuated by said first means; third means for correcting said first output in accordance with known barometric variation from a predetermined reference value; sensing means for obtaining a second output of said altitude sensing instrument; said sensing means having a first input responsive to said first output, as combinedly determined by said first, second and third means; and a second input responsive to said third means; said sensing means combining said first and second inputs in a manner obtaining said second output, representative of said first output, as referenced to said predetermined value; coupling means for presenting said second output to said encoder means; said coupling means including a first error correction means, predeterminedly adjusted for repeatable system errors, and differential means; said second output driving said first error correction means, and a first input of said differential means; the driven position of said first error correction means presenting a second input signal to said differential; the output of said differential means positioning said encoder means, whereby said encoder means is driven by said second output signal, as referenced to said predetermined reference value, and corrected for repeatable system errors; said sensing means comprising a differentially driven Synchrotel wherein one said first or second Synchrotel input signals mechanically drives the Synchrotel rotor, and the other of said first or second signals mechanically drives the Synchrotel stator, whereby the rotor-to-stator position of said Synchrotel remains unchanged responsive to a third means correction for barometric variation.

References Cited by the Examiner
UNITED STATES PATENTS
3,009,358  11/1961  Angus _____ 73—387 X LOUIS R. PRINCE, *Primary Examiner.*